United States Patent [19]

Kato

[11] 4,300,232

[45] Nov. 10, 1981

[54] SELF SYNCHRONIZED MULTIPLEXER/DEMULTIPLEXER

[75] Inventor: David S. Kato, Fountain Valley, Calif.

[73] Assignee: Ford Aerospace & Communications Corporation, Detroit, Mich.

[21] Appl. No.: 92,792

[22] Filed: Nov. 9, 1979

[51] Int. Cl.³ .............................................. H04J 3/06
[52] U.S. Cl. ..................................... 370/100; 370/112
[58] Field of Search ................. 370/100, 110, 112, 47; 375/106, 107, 111, 113

[56] References Cited

U.S. PATENT DOCUMENTS

| | | | |
|---|---|---|---|
| 2,548,345 | 4/1951 | Butts | 177/351 |
| 2,962,552 | 11/1960 | Crowley | 179/15 |
| 3,162,838 | 12/1964 | Sauvanet | 340/147 |
| 3,353,158 | 11/1967 | Davis et al. | 364/200 |
| 3,404,231 | 10/1968 | Aaron et al. | 370/100 |
| 3,467,782 | 9/1979 | Plouffe et al. | 370/100 |
| 3,804,982 | 4/1974 | Brown | 378/72 |
| 3,922,486 | 11/1975 | De Jean | 370/100 |
| 3,980,820 | 9/1976 | Neimi et al. | 370/100 |
| 3,988,716 | 10/1976 | Fletcher et al. | 370/100 |
| 4,010,326 | 3/1977 | Schwartz | 370/100 |
| 4,031,316 | 6/1977 | Reisinger et al. | 370/41 |
| 4,050,062 | 9/1977 | Crocker et al. | 340/183 |
| 4,054,754 | 10/1977 | Nicodemus et al. | 370/100 |
| 4,093,825 | 6/1978 | Gladstone et al. | 370/100 |

Primary Examiner—Douglas W. Olms
Attorney, Agent, or Firm—Edward J. Radlo; Clifford L. Sadler

[57] ABSTRACT

This multiplexer and demultiplexer features two transmission lines, one for conveying the data and a second for timing. The timing line controls both the shifting of data in the demultiplexer and the signaling for the beginning and end of data words. Synchronization of the bit shifting clock with the word shifting signal is accomplished by means of phase lock loop circuitry incorporated into the demultiplexer. The disclosed circuit uses low power CMOS design, directly interfaces with contact closure commands, and directly drives relay or lamp type loads. The demultiplexer contains a power-up delay circuit to avoid start-up ambiguities and false data transmission.

8 Claims, 3 Drawing Figures

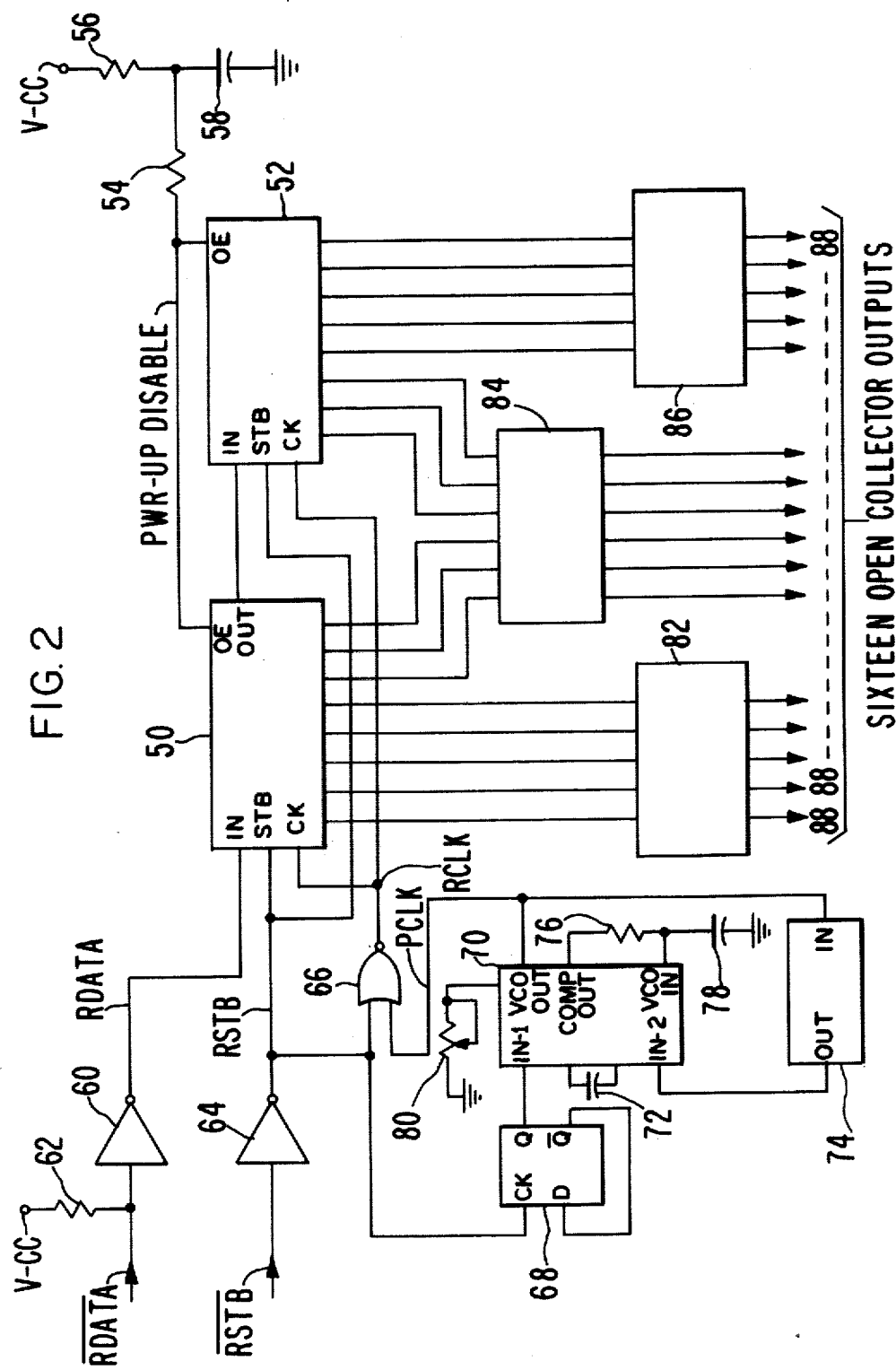

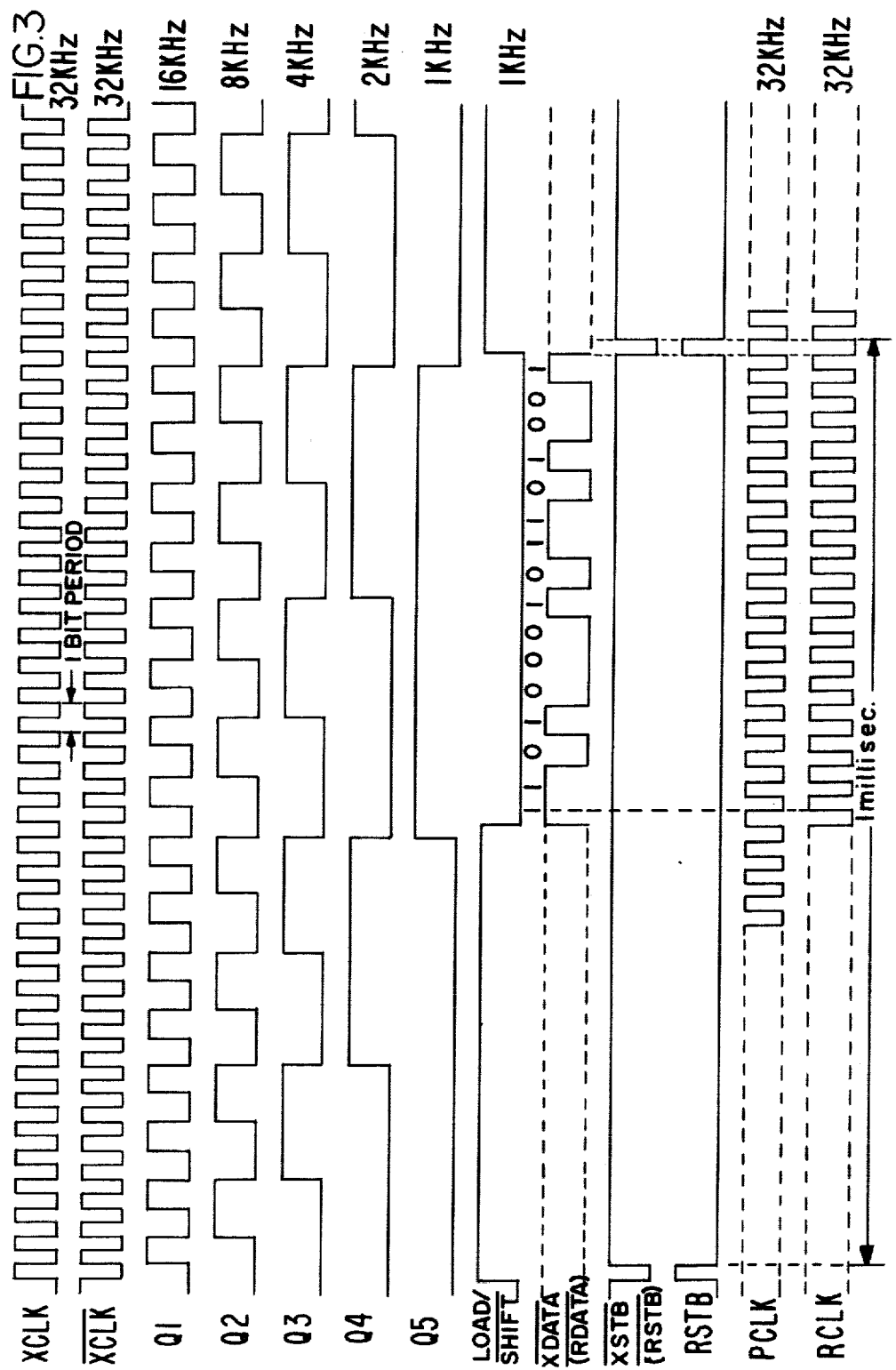

SELF SYNCHRONIZED MULTIPLEXER/DEMULTIPLEXER

BACKGROUND OF THE INVENTION

1. Field of the Invention

This invention is a digital multiplexer and demultiplexer circuit having a data transmission line and a synchronization line suitable e.g., for system control multiplexing.

2. Description of the Prior Art

U.S. Pat. No. 3,804,982 shows a serial data transmission system wherein one line is used for data and synchronization, unlike the present invention wherein a separate synchronization line is employed.

U.S. Pat. No. 4,054,754 is a data transmission system wherein the synchronization information is interleaved with data and goes out on line SDOUT (see FIG. 5). TSWOUT is not a synchronizer.

U.S. Pat. No. 4,050,062 is an analog to digital multiplexer employing parallel data transmission. The present invention is a digital multiplexer employing serial transmission.

U.S. Pat. No. 2,962,552 is an analog, not a digital, multiplexer which does not discuss synchronization in detail. The synchronization circuitry 15, 16, 17, 18 and 19 comprises extraneous boxes which are not relevant to the present invention.

U.S. Pat. No. 3,980,820 is a repeater, not a multiplexer. It resends data at a new phase. It reclocks the data with new clock 10. It employs separate clock and synchronization inputs. The present invention combines a clock function and word synchronization on a single line.

Secondary references, in which data information and synchronizing information are interleaved, are: U.S. Pat. Nos. 2,548,345, 2,495,168, 3,162,838, 3,353,158, 3,404,231 and 4,031,316.

SUMMARY OF THE INVENTION

The present invention is a digital multiplexing/demultiplexing system in which a plurality of input signals or commands are received by the control multiplex stage and converted into a serial data stream which is transmitted on a single line to the control demultiplexing stage. A strobe signal on a separate strobe or synchronizing line synchronizes the multiplex stage with the demultiplex stage. The demultiplexer decodes the serial data stream to cause a corresponding plurality of output signals to be sent which may correspond to controlling output devices in accordance with the input commands. The demultiplexer is self synchronized by a phase lock loop which regenerates the bit shifting clock signal from the word strobing signal coming over the strobe line. The simplicity of the system is enhanced by having the data line separate from the strobe line unlike certain prior art systems where data and strobing are interleaved. The system can be fabricated with as few as 19 dual-in-line integrated circuits and two d.c. power supplies.

The system has been implemented in CMOS circuitry, which results in low power consumption (less than one watt total system power consumption for the embodiment illustrated).

Word and bit synchronization is achieved using a phase lock loop design which synchronizes a clock signal that controls bit shifting in the demultiplexer with a strobe signal which signals the beginning and end of a data word for transmission thereof. A preferred word length is 16 bits but this can be varied as desired.

In the embodiment illustrated, input commands may be updated approximately every one millisecond. The multiplexer directly interfaces with contact closure commands by means of switch debouncers.

Start-up ambiguities and false transmissions are eliminated by a power-up delay circuit in the demultiplexer stage, which has been designed to offer the capability of directly driving relay or lamp type loads by virtue of its open collector transistor outputs.

The present invention has particular application for reducing the number of slip rings on a rate table test station, but is not limited to this application.

BRIEF DESCRIPTIONS OF THE DRAWINGS

These and other more detailed and specific objects and features of the present invention are more fully disclosed in the following specification, reference being had to the accompanying drawings, in which;

FIG. 2 is a schematic diagram of the demultiplexer of the preferred embodiment; and FIG. 3 is a timing diagram showing the voltage waveforms at various key points in the multiplexer and demultiplexer of FIGS. 1 and 2.

DESCRIPTION OF THE PREFERRED EMBODIMENT

Figure 1:
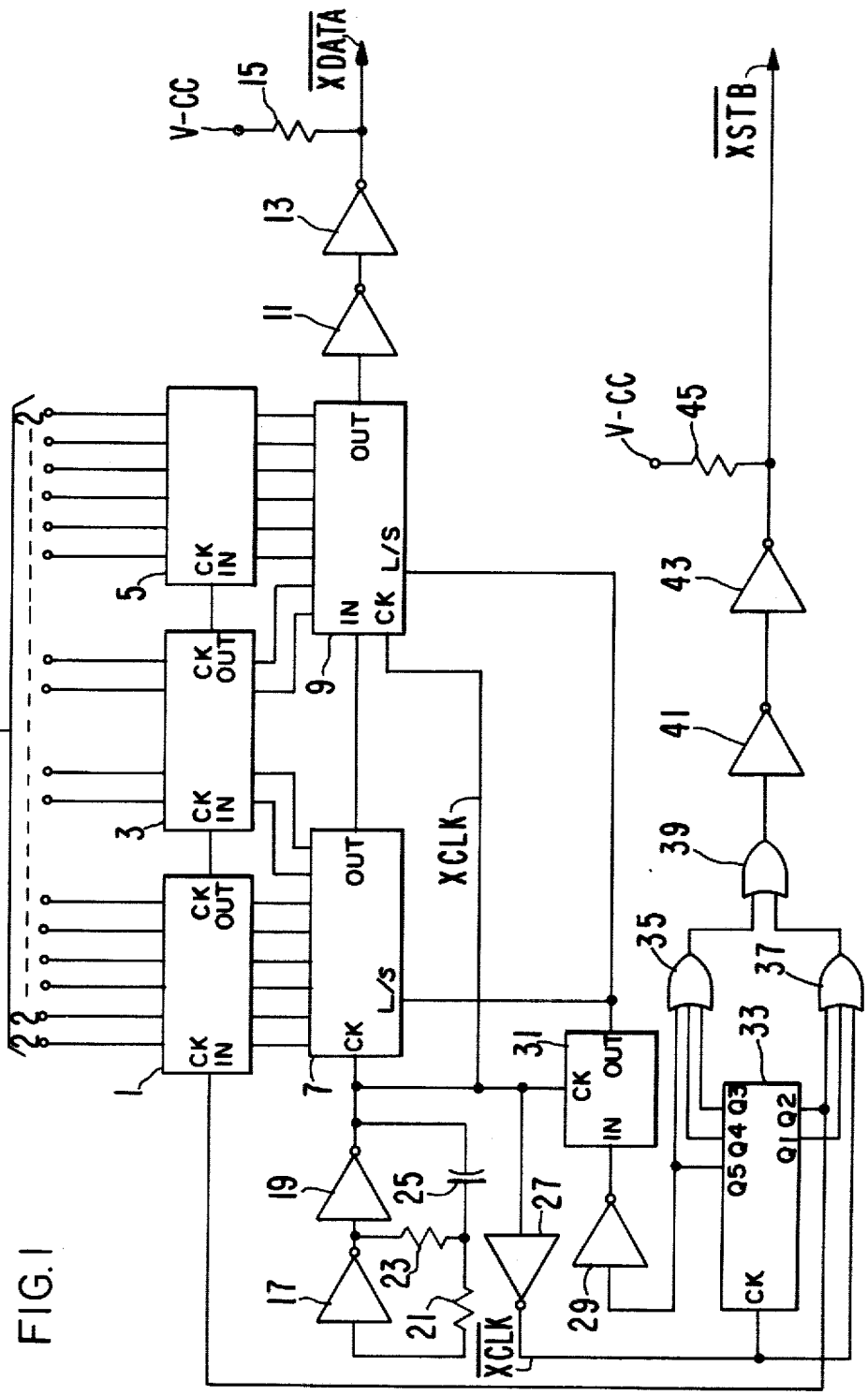
FIG. 1 is a schematic diagram of the mutliplexer of the preferred embodiment.

The present invention may be best understood by looking at FIG. 3, the set of timing waveforms, in conjunction with FIG. 1, the circuit of the multiplexer, and FIG. 2, the circuit of the demultiplexer.

FIG. 1 shows a set of 16 input channels 2 which contain binary information fed as inputs to debouncers 1, 3, and 5. The circuit has been designed to accommodate a reentry of data on these input channels every millisecond. This is an arbitrary specification and can be varied by changing the clock frequencies supplied to debouncer 1 and register 7. The inputs can be mechanical switches which are grounded to indicate a binary 1 and left open to represent a binary 0. The number of input channels is arbitrary and can be varied by varying the number of components (e.g., debouncers 1, 3, and 5 and registers 7 and 9) and/or by selecting components that can accommodate a different number of inputs.

Debouncers 1, 3 and 5 are switch debouncers, such as those designated as MC14490EFL which can accept 6 inputs each. They are meant to accept mechanical contact switching and serve to eliminate chatter caused thereby. The clock output of debouncer 1 is connected to the clock input of debouncer 3 and the clock output of debouncer 3 is connected to the clock input of debouncer 5 thus making one 16 bit debouncer from three chips. Connected to the clock input of debouncer 1 is an 8 KHz square wave obtained from the Q2 output of counter 33. The debouncer works on the basis that the signals inputted to the debouncer will be outputted a period of time equal to $3\frac{1}{2}$ to $4\frac{1}{2}$ times the period of the clock after the jitter on the input signal clears. Thus an 8 KHz clock pulse is adequate to achieve the desired (arbitrary) specification of allowing the input commands 2 to be changed every milli-second.

The outputs from debouncer 1, 3, and 5 are provided to shift registers 7 and 9, which can be CD4021BE shift registers, each of which contains eight positions. They are wired together to make one 16 bit shift register by means of connecting the output of register 7 with the input of register 9.

A 32 KHz square wave designated XCLK is applied at the clock inputs of registers 7 and 9 to control the shifting rate of the bits in a left to right direction through the registers. This 32 KHz signal is generated by the oscillator comprising inverters 17 and 19, resistors 21 and 23, and capacitor 25. The input of inverter 17 is connected to one end of resistor 21, the other end of which is connected to a first end of resistor 23 and to a first end of capacitor 25, the other end of which is connected to the output of inverter 19 and the clock inputs to registers 7 and 9. The other end of resistor 23 is connected to the output of inverter 17 and the input of inverter 19. The time constant of the combination of resistor 23 and capacitor 25 determines the clock frequency of the oscillator. This frequency determines the rate at which data is shifted through combined shift registers 7, 9 and the rate at which data is shifted out of the shift registers through inverters 11 and 13 and through the $\overline{\text{XDATA}}$ transmission line. Each data bit in register 7, 9 shifts one position on each positive going edge of XCLK. Thus, each data bit is a full cycle wide.

The output of register 9 is connected to the input of inverter 11, the output of which is connected to the input of inverter 13, the output of which is the $\overline{\text{XDATA}}$ line. Inverter 11 inverts the waveform. Inverter 13 reinverts the polarity of the waveform and provides the driving power required to transmit the serial data over the required distance. V-CC is a DC power supply which is connected to one end of resistor 15, the other end of which is connected to the output terminal of inverter 13. Resistor 15 provides needed resistance for the collector of driver 13 to operate. V-CC can be the same voltage which is applied to one end of resistor 45, thus simplifying the circuit.

The 32 KHz XCLK waveform is also inverted by inverter 27 to make waveform $\overline{\text{XCLK}}$ and this signal is then fed to the clock input of counter 33, which is a binary counter such as a CD4520BE. This counter has five outputs Q1, Q2, Q3, Q4, and Q5 each of which maintains the squarewave shape of the input waveform but divides ts frequency by 2, 4, 8, 16, and 32, respectively.

Binary counter 33 advances count on the positive going edge of $\overline{\text{XCLK}}$, which is applied to its clock input. In other words, the positive going edges of each of Q1, Q2, Q3, Q4, and Q5 are aligned with positive going edges of $\overline{\text{XCLK}}$. The Q5 signal from counter 33 is inverted by inverter 29 and applied to the delay input of delay flip-flop 31. Flip-flop 31 is clocked by means of XCLK and its output is a signal designated LOAD/-$\overline{\text{SHIFT}}$. LOAD/$\overline{\text{SHIFT}}$ is applied to the LOAD/-SHIFT inputs of shift registers 7 and 9 to control the loading and shifting thereof. Flip-flop 31 delays the input signal one half of a bit period (one half cycle of the 32 KHz clock) so that the negative going edge (as well as the positive going edge) of LOAD/$\overline{\text{SHIFT}}$ coincides with a positive going edge of XCLK, thus coordinating the bit synchronization and word synchronization of registers 7, 9. LOAD/$\overline{\text{SHIFT}}$ controls when register 7, 9 loads and shifts data. When LOAD/$\overline{\text{SHIFT}}$ is high, the shift register's cells are instantaneously loaded with the present outputs from debouncers 1, 3, and 5. When LOAD/$\overline{\text{SHIFT}}$ is low, the shift register's parallel inputs are disabled and the present contents of the shift registers are shifted out serially at the 32 KHz XCLK rate.

$\overline{\text{XSTB}}$ is also a derivative of the XCLK signal and is generated by a logical OR'ing of $\overline{\text{XCLK}}$, Q1, Q2, Q3, Q4, and Q5. This OR'ing can be accomplished by means of three separate OR-gates wired together: OR-gate 35 OR'ing Q3, Q4, and Q5; OR-gate 37 OR'ing Q1, Q2, and $\overline{\text{XCLK}}$; and OR-gate 39 OR-ing the outputs of OR-gates 35 and 37. This OR'd output is inverted by inverter 41 and reinverted by driver 43 which is also a digital inverter. Driver 43 provides the power required to transmit this strobe (synchronizing) signal over the required distance. The $\overline{\text{XSTB}}$ signal is used to frame the $\overline{\text{XDATA}}$ words so that the beginning and end of each word is known. Note that $\overline{\text{XSTB}}$ has a frequency of 1 KHz but is not a 50% duty cycle squarewave. This is the same frequency (every one millisecond) that the input channels are sampled for transmission.

Resistor 45 is connected between DC power supply V-CC and the output terminal of driver 43 and provides the needed resistance for the collector of driver 43 to operate.

The Q2 output of counter 33 is also fed to the clock input terminal of debouncer 1 to provide the clock therefor.

FIG. 2 is the demultiplexer of the preferred embodiment. $\overline{\text{RDATA}}$ is the same transmission line as $\overline{\text{XDATA}}$ after it has passed through the slip ring or other transmission medium. Similarly, $\overline{\text{RSTB}}$ is the same as the strobe line $\overline{\text{XSTB}}$ after it has passed through the transmission medium. The received data $\overline{\text{RDATA}}$ is inverted by inverter 60 and applied to the input of shift and store registers 50, 52. The output of shift and store register 50 is connected to the input of shift and store register 52 to make one 16 bit shift and store register. Other registers could be connected together if a longer word is desired. The reason for inverting the polarity by inverter 60 is that driver arrays 82, 84, and 86 also invert the polarity and thus the original polarity of RDATA is preserved.

Resistor 62 is connected between DC power supply V-CC, which can be the same value as in the multiplexer (typically 15 volts) and the input terminal of inverter 60. The purpose of resistor 62 is to preserve the integrity of the data by placing a logical one at the input to inverter 60 if there is a malfunction in the transmission line between $\overline{\text{XDATA}}$ and $\overline{\text{RDATA}}$. The value of resistance 62 is selected based upon characteristics of inverter 60 and the transmission line.

The received strobe signal $\overline{\text{RSTB}}$ is inverted by inverter 64 to become RSTB and applied to the strobe input terminals of registers 50 and 52. The positive going edge of RSTB causes the present contents of registers 50 and 52 to be outputted in parallel to driver arrays 82, 84 and 86.

Driver arrays 82, 84, and 86 can be a set of base input-collector output transistors. For example, each can be a ULN2004AN, which comprises six Darlington transistors. These invert the polarities of the input signals. Drivers 82, 84 and 86 could be other drivers depending on what the system must drive. The outputs of the drivers are a set of 16 terminals each designated 88.

Power-up circuit 54, 56, 58 is used to prevent the dumping of spurious data when the demultiplexer is initially turned on. Power supply V-CC is a direct current power supply (and can be the same as the power supply connected to resistor 62, thus simplifying the circuit) and is connected to one end of resistor 56, the other end of which is connected through capacitor 58 to ground and through resistor 54 to the output enable terminals of registers 50 and 52 via the power-up disable line. The time constant of the combination of resistor 56 and capacitor 58 determines an initial time delay period during which the demultiplexer circuit is disabled.

To regenerate the bit shifting clock from the word synchronizing signal RSTB, the output of inverter 64 is clocked down by a factor of two by divide-by-two flip-flop 68. The input signal RSTB is applied at the clock terminal of flip-flop 68 and the output signal appears at the Q output terminal of the flip-flop squared off into a 50% duty cycle squarewave at frequency 500 Hz. The output Q of the flip-flop transitions either up or down on a positive going edge of the input signal at the clock terminal of the flip-flop. The output signal is applied to the IN-1 terminal of phase lock loop (PLL) chip 70. The D and the $\overline{Q}$ terminals of flip-flop 68 are wired together.

PLL chip 70 (which can be a CD4046BE, containing a voltage controlled oscillator and a phase comparator) and divide-by-64 counter 74 together constitute a phase lock loop which synchronizes the phase between the IN-1 and IN-2 terminals of chip 70 and locks the frequency appearing at the VCO OUT terminal of chip 70. This frequency is 64 times the frequency at IN-1. Capacitor 72 (connected between two appropriate leads of chip 70), resistor 76, capacitor 78, and resistor 80 are selected according to the input frequency and are required to make the phase lock loop operational at the desired frequency. Resistor 76 is connected between the COMP OUT and the VCO IN terminals of chip 70. Capacitor 78 is connected between the VCO IN terminal of chip 70 and ground.

Divide-by-64 counter 74 is connected between the VCO OUT terminal and the IN-2 terminal of chip 70. It determines the multiplication at the VCO OUT terminal of chip 70, in this case 64 times the frequency applied to the IN-1 and the IN-2 terminals. The VCO OUT signal is phase locked with the signal applied at IN-1.

Potentiometer 80 is connected between an appropriate terminal of chip 70 and ground. It is used to adjust the relative position between the received data RDATA and the bit shifting clock RCLK. Since the received data is clocked into the register 50, 52 on the positive going edge of RCLK it is advantageous for noise immunity reasons to align this positive going edge in the center of each data bit (illustrated in FIG. 3 as pertaining to the inverse of RDATA).

The output from the VCO OUT terminal of chip 70 (a 32 KHz waveform designated PCLK) is applied to one input terminal of NOR-gate 66, the other input terminal of which is provided by signal RSTB from the output of inverter 64. The output of NOR-gate 66 (designated RCLK) is provided to the clock input terminals of registers 50 and 52 to determine the rate at which data is serially shifted into these serial-in parallel-out shift registers. NOR-gate 66 makes the system immune to jitter by disabling a positive going edge of RCLK which might occur just outside the data region. NOR-gate 66 chops off any such 17th shift pulse, which would cause spurious shifting. In other words, RCLK is always a logical "zero" at the point where RSTB is a logical "one" (the region between the two parallel vertical dotted lines in FIG. 3) regardless of the value of PCLK at that point. The NOR-ing eliminates time jitter between RDATA and RCLK from causing false shifting of data prior to data dumping by registers 50, 52.

The above multiplexer/demultiplexer can be used any time it is desired to have separate data transmission and strobing lines, with both bit synchronization and word synchronization on the strobing line.

The above description is included to illustrate the operation of the preferred embodiments and is not meant to limit the scope of the invention. The scope of the invention is to be limited only by the following claims. From the above discussion many variations will be apparent to one skilled in the art that would yet be encompassed by the spirit and scope of the invention.

What is claimed is:

1. An apparatus for multiplexing parallel data into serial data and demultiplexing the serial data into parallel form comprising:
   a data transmission line connected to a multiplexer and to a demultiplexer for conveying said serial data from said multiplexer to said demultiplexer; and
   a strobe line connected to said multiplexer and to said demultiplexer for controlling both bit synchronization and word synchronization of said serial data;
   wherein said strobe line contains word synchronization signals and said demultiplexer comprises a phase lock loop to regenerate bit synchronizing signals from said word synchronizing signals.

2. The apparatus of claim 1 wherein said demultiplexer further comprises at least one serial-in parallel-out shift register.

3. A demultiplexer having an input data line and an input strobe line wherein all the strobe signals necessary for bit and word synchronization of said data are contained on said strobe line;
   wherein said strobe signals constitute word sychronizing signals only; said demultiplexer further comprising means for converting said word synchronizing signals into bit synchronizing signals.

4. The demultiplexer of claim 3 wherein said converting means comprises a phase lock loop.

5. The demultiplexer of claim 4 further comprising means for inhibiting bit synchronizing signals that occur during the same time period as said word synchronizing signals.

6. Apparatus of claim 5 wherein said inhibiting means comprises a NOR gate.

7. Apparatus of claim 3 further comprising means for forcing all the outputs of said demultiplexer to be zeroes when power is first applied to said demultiplexer so as to prevent the outputting of spurious random information.

8. A digital multiplexer comprising:
   means for generating a bit shifting signal;
   means connected to said generating means for deriving a word shifting signal from said bit shifting signal;
   a plurality of input lines each conveying input bits;
   parallel-in serial-out shifting means connected to said input lines, said generating means, and said deriving means, for accepting input bits from said input lines and for shifting said bits in response to said word shifting signal at a frequency corresponding to the frequency of said bit shifting signal;
   a strobe line connected to said deriving means and to a first output terminal, said strobe line conveying only said word shifting signal; and
   a data line connected to said shifting means and to a second output terminal, said data line conveying only said serialized bits.

* * * * *